(12) United States Patent
Cleveland et al.

(10) Patent No.: US 7,383,212 B1
(45) Date of Patent: Jun. 3, 2008

(54) METHOD, SYSTEM AND COMPUTER PROGRAM PRODUCT FOR HISTORICAL ACCOUNT STATEMENTS

(75) Inventors: A. Bruce Cleveland, Arlington, VA (US); Curt R. Johnson, Montgomery Village, MD (US)

(73) Assignee: Presidential Bank, FSB, Bethesda, MD (US)

( * ) Notice: Subject to any disclaimer, the term of this patent is extended or adjusted under 35 U.S.C. 154(b) by 0 days.

(21) Appl. No.: 09/510,984

(22) Filed: Feb. 22, 2000

Related U.S. Application Data

(60) Provisional application No. 60/121,134, filed on Feb. 22, 1999.

(51) Int. Cl.
*G06Q 40/00* (2006.01)

(52) U.S. Cl. .......................... 705/35; 705/36; 705/35; 705/5; 705/26

(58) Field of Classification Search ................. 705/14, 705/10, 37, 38, 34, 36, 35; 380/9; 395/615; 345/764, 727, 733
See application file for complete search history.

(56) References Cited

U.S. PATENT DOCUMENTS

| | | | |
|---|---|---|---|
| 5,220,501 A | 6/1993 | Lawlor et al. | |
| 5,247,575 A * | 9/1993 | Sprague et al. | 379/55.1 |
| 5,341,290 A | 8/1994 | Lu | |
| 5,373,550 A | 12/1994 | Campbell et al. | |
| 5,608,874 A * | 3/1997 | Ogawa et al. | 709/246 |
| 5,712,987 A | 1/1998 | Waits et al. | |
| 5,721,831 A | 2/1998 | Waits et al. | |
| 5,740,427 A * | 4/1998 | Stoller | 707/104.1 |
| 5,812,989 A | 9/1998 | Witt et al. | |
| 5,848,413 A * | 12/1998 | Wolff | 707/10 |
| 5,870,724 A | 2/1999 | Lawlor et al. | |
| 5,870,725 A | 2/1999 | Bellinger et al. | |
| 5,878,201 A * | 3/1999 | Onishi | 714/6 |
| 5,895,455 A | 4/1999 | Bellinger et al. | |
| 6,249,770 B1 * | 6/2001 | Erwin et al. | 705/10 |
| 6,321,208 B1 * | 11/2001 | Barnett et al. | 705/14 |
| 6,744,448 B1 * | 6/2004 | Bernard et al. | 345/764 |

OTHER PUBLICATIONS

External Reporting of Budget and Performance Information: Building Public Trust, Byby Sheffield, Sheila Ruth, The Florida State University, 1998, 256; ATT 9911449.*

* cited by examiner

*Primary Examiner*—Frantzy Poinvil
*Assistant Examiner*—Clement Graham
(74) *Attorney, Agent, or Firm*—Oblon, Spivak, McClelland, Maier & Neustadt, P.C.

(57) ABSTRACT

A method, apparatus, and computer program product for storing and retrieving historical account statements for online display. Historical account statements are stored and made available for retrieval online by using a text version of an organization's statements stored for periodic printing and mailing of statements. The statement displayed for online viewing appears as a duplicate, in all material respects, of the printed and mailed statements.

20 Claims, 22 Drawing Sheets

```
PRESIDENTIAL SAVINGS BANK FSB
INTERNET TEST ACCOUNT #1
4520 E WEST HWY
BETHESDA MD 20814-3319
                                                      ACCOUNT 99-99-99999

STATEMENT END DATE      ACCOUNT       ENDING     R-E-M-A-R-K-S              PAGE
      30-SEP-97           NUMBERS       BALANCES   AS OF: 30-SEP-97            1
SUMMARY:
   SUPER NOW ACCOUNT   99-99-99999      2,675.15   YEAR TO DATE INT.           51.71
************************************ SUPER NOW ACCOUNT *****************************
                                        99-99-99999
   DATE      DESCRIPTION                                                     BALANCE
   ----      -----------                          DEPOSITS    WITHDRAWALS    -------
   1-SEP-97  "PREVIOUS BALANCE" ----------------------------------------->   1,444.47
   2 SEP     POS WITHDRAWAL                                    40.70         1,403.77
             GIANT OF OLD GEORGETOBETHESDA    MD
             EFFECTIVE    1 SEP
   2 SEP     ATM WITHDRAWAL                                    61.00         1,342.77
             ANNAPOLIS EASTPORT        ANNAPOLIS MD
             EFFECTIVE    1 SEP
   2 SEP     ATM WITHDRAWAL                                   176.00         1,166.77
             CRESTAR BAWILDWOOD        BETHESDA  MD
             EFFECTIVE   31 AUG
   2 SEP     CHECK#   552                                      90.00         1,076.77
   2 SEP     CHECK#   553                                      52.00         1,024.77
   2 SEP     ATM WITHDRAWAL                                   101.00           923.77
             CHEVY CHASSAFEWAY #1365   FAIRFAX   VA
   4 SEP     CASH DEPOSIT                       5,136.58                     6,060.35
   4 SEP     CHECK#   554                                     228.44         5,831.91
   4 SEP     ATM WITHDRAWAL                                   101.00         5,730.91
             9280 OLD CIRRUS ATM       BURKE     VA
   5 SEP     CHECK#   557                                     420.63         5,310.28
   5 SEP     ATM WITHDRAWAL                                    51.00         5,259.28
             MELLON BANBETHESDA        BETHESDA  MD
   8 SEP     ATM WITHDRAWAL                                   100.00         5,159.28
             PRESIDENTI4520 EAST-WEST HIGBETHESDA MD
             EFFECTIVE    6 SEP
   8 SEP     ATM WITHDRAWAL                                   201.50         4,957.78
             FIRST UNIOKINGS PARK      SPRINGFIELVA
             EFFECTIVE    7 SEP
   8 SEP     CHECK#   556                                     468.46         4,489.32
  10 SEP     CHECK#   569                                      84.13         4,405.19
  10 SEP     CHECK#   558                                      32.51         4,372.68
  10 SEP     CHECK#   559                                     325.00         4,047.68
  10 SEP     ATM WITHDRAWAL                                    41.00         4,006.68
             CHEVY CHASSAFEWAY #907    SPRINGFIELVA
  11 SEP     CHECK#   570                                     200.00         3,806.68

```
PRESIDENTIAL SAVINGS BANK FSB
INTERNET TEST ACCOUNT #1
4520 E WEST HWY
BETHESDA MD 20814-3319
                                                                ACCOUNT 99-99-99999

STATEMENT END DATE                                                          PAGE
      30-SEP-97                                                                  2
                                    99-99-99999
    DATE     DESCRIPTION                                                       BALANCE
    ------   ------------              DEPOSITS   WITHDRAWALS                  -------
    11 SEP      CHECK#  567                            40.56                   3,766.12
    11 SEP      CHECK#  561                         1,087.55                   2,678.57
    11 SEP      CHECK#  568                           207.00                   2,471.57
    11 SEP      CHECK#  565                           199.78                   2,271.79
    11 SEP      ATM WITHDRAWAL                        101.50                   2,170.29
             SIGNET/MD 1776 EAST JEFFERSOROCKVILLE MD
    12 SEP      CHECK#  562                           570.51                   1,599.78
             EFFECTIVE  11 SEP
    12 SEP      CHECK#  572-C                         200.00                   1,399.78
    12 SEP      CHECK#  560                            25.75                   1,374.03
    13 SEP      ATM WITHDRAWAL                        201.00                   1,173.03
             FIRST VIRG9521 BRADDOCK RD  FAIRFAX   VA
    13 SEP      ATM WITHDRAWAL                         50.00                   1,123.03
             PRESIDENTI4520 EAST-WEST HIGBETHESDA  MD
    15 SEP      ATM WITHDRAWAL                         96.00                   1,027.03
             CRESTAR BACATHEDRAL 2       WASHINGTONDC
             EFFECTIVE  14 SEP
    15 SEP   CHECK DEPOSIT              72.99                                  1,100.02
    15 SEP      CHECK#  566                            50.00                   1,050.02
    15 SEP      CHECK#  564                            28.12                   1,021.90
    16 SEP      POS WITHDRAWAL                        100.00                     921.90
             GIANT OF M10400 OLD GEORGETOBETHESDA  MD
    17 SEP      CHECK#  574                            39.57                     882.33
    17 SEP      CHECK#  573                           185.22                     697.11
    17 SEP      POS WITHDRAWAL                         30.00                     667.11
             GIANT OF M10400 OLD GEORGETOBETHESDA  MD
    18 SEP      ATM WITHDRAWAL                        100.00                     567.11
             PRESIDENTI4520 EAST-WEST HIGBETHESDA  MD
    19 SEP   CHECK DEPOSIT            1,300.00                                 1,867.11
    19 SEP      CHECK#  563                         1,480.67                     386.44
             EFFECTIVE  18 SEP
    19 SEP      ATM WITHDRAWAL                         20.00                     366.44
             PRESIDENTI4520 EAST-WEST HIGBETHESDA  MD
    20 SEP      ATM WITHDRAWAL                        201.50                     164.94
             FIRST UNIOKINGS PARK         SPRINGFIELVA
    22 SEP   CHECK DEPOSIT            1,550.00                                 1,714.94
    24 SEP      CHECK#  575                         1,000.00                     714.94
    29 SEP      ATM WITHDRAWAL                        101.50                     613.44
             CRESTAR BACONGRESSIONAL     ROCKVILLE MD

```
PRESIDENTIAL SAVINGS BANK FSB
INTERNET TEST ACCOUNT #1
4520 E WEST HWY
BETHESDA MD 20814-3319
                                                       ACCOUNT 99-99-99999
                                                                              PAGE
   STATEMENT END DATE                                                          3
      30-SEP-97
                              99-99-99999
                                                                            BALANCE
   DATE    DESCRIPTION
                                                DEPOSITS   WITHDRAWALS      -------
           EFFECTIVE  28 SEP
29 SEP     JOURNAL CREDIT                        2,100.23                   2,713.67
           MONTGOMERY COUNTY PAYROLL
           EFFECTIVE  30 SEP
30 SEP     POS WITHDRAWAL                                      46.13        2,667.54
           SUTTON PLA10323 OLD GEORGETOBETHESDA MD
30 SEP     INTEREST CREDIT                          7.61                    2,675.15
30-SEP-97  "NEW BALANCE" ----------------------------------------->         2,675.15

TOTAL AMOUNT OF CREDITS      10,167.41    TOTAL AMOUNT OF DEBITS         8,936.73
         NUMBER OF CREDITS              6          NUMBER OF DEBITS               42

TOTAL AMT. ATM CREDITS             .00    TOTAL AMT. ATM DEBITS          1,704.00
         NUMBER ATM CREDITS             0          NUMBER ATM DEBITS              16

TOTAL AMT. POS CREDITS             .00    TOTAL AMT. POS DEBITS            216.83
         NUMBER POS CREDITS             0          NUMBER POS DEBITS                4

********************** ANNUAL PERCENTAGE YIELD EARNED (APYE) **********************
   DAYS IN PERIOD    =  30                 INTEREST PAID   =  7.61
   AVERAGE BALANCE   =  1,826.95           ANNUAL PERCENTAGE YIELD EARNED =  5.19%
***********************************************************************************

---------CHECKS----------    ---------CHECKS----------    ---------CHECKS----------
         ITEM   DATE     AMOUNT       ITEM   DATE     AMOUNT       ITEM   DATE     AMOUNT 552   02SEP      90.00       561   11SEP   1,087.55       568   11SEP     207.00
          553   02SEP      52.00       562   12SEP     570.51       569   10SEP      84.13
          554   04SEP     228.44       563   19SEP   1,480.67       570   11SEP     200.00
        * 556   08SEP     468.46       564   15SEP      28.12     * 572   12SEP     200.00
          557   05SEP     420.63       565   11SEP     199.78       573   17SEP     185.22
          558   10SEP      32.51       566   15SEP      50.00       574   17SEP      39.57
          559   10SEP     325.00       567   11SEP      40.56       575   24SEP   1,000.00
          560   12SEP      25.75

CY-31   CO-0000   BA-00   BK-02   08440

Back To Demo Page: Click here Return home.
```

Fig. 5D

```
<html>
<head>
<title>Connection</title>
</head>

<body BACKGROUND="backgrnd.gif" BGCOLOR="#C0C0C0" LEFTMARGIN="10" TOPMARGIN="10">  ── 602

<p><img Align="Top" alt="presidential logo" BORDER="0" SRC="logo.gif" width="343"  ── 604
height="115"><b></p>
606 ─<pre>
```

PRESIDENTIAL SAVINGS BANK FSB
INTERNET TEST ACCOUNT #1
4520 E WEST HWY
BETHESDA MD 20814-3319

ACCOUNT 99-99-99999

STATEMENT END DATE  ACCOUNT   ACCOUNT   ENDING   R-E-M-A-R-K-S      PAGE
  30-SEP-97       NUMBERS   BALANCES  AS OF: 30-SEP-97    1

Fig. 6A

SUMMARY:
SUPER NOW ACCOUNT 99-99-99999     2,675.15   YEAR TO DATE INT.   51.71
********************************* SUPER NOW ACCOUNT *********************************
99-99-99999

| DATE | DESCRIPTION | DEPOSITS | WITHDRAWALS | BALANCE |
|---|---|---|---|---|
| 1-SEP-97 | "PREVIOUS BALANCE" | | ----> | 1,444.47 |
| 2 SEP | POS WITHDRAWAL | | 40.70 | 1,403.77 |
| | GIANT OF OLD GEORGETOBETHESDA MD | | | |
| | EFFECTIVE 1 SEP | | | |
| 2 SEP | ATM WITHDRAWAL | | 61.00 | 1,342.77 |
| | ANNAPOLIS EASTPORT    ANNAPOLIS MD | | | |
| | EFFECTIVE 1 SEP | | | |
| 2 SEP | ATM WITHDRAWAL | | 176.00 | 1,166.77 |
| | CRESTAR BAWILDWOOD    BETHESDA MD | | | |
| | EFFECTIVE 31 AUG | | | |
| 2 SEP | CHECK# 552 | | 90.00 | 1,076.77 |
| 2 SEP | CHECK# 553 | | 52.00 | 1,024.77 |
| 2 SEP | ATM WITHDRAWAL | | 101.00 | 923.77 |
| | CHEVY CHASSAFEWAY #1365  FAIRFAX VA | | | |
| 4 SEP | CASH DEPOSIT | 5,136.58 | | 6,060.35 |
| 4 SEP | CHECK# 554 | | 228.44 | 5,831.91 |
| 4 SEP | ATM WITHDRAWAL | | 101.00 | 5,730.91 |
| | 9280 OLD CIRRUS ATM   BURKE VA | | | |
| 5 SEP | CHECK# 557 | | 420.63 | 5,310.28 |
| 5 SEP | ATM WITHDRAWAL | | 51.00 | 5,259.28 |
| | MELLON BANBETHESDA    BETHESDA MD | | | |

Fig. 6B

```
8 SEP    ATM WITHDRAWAL                                  100.00    5,159.28
         PRESIDENTI4520 EAST-WEST HIGBETHESDA MD
         EFFECTIVE  6 SEP
8 SEP    ATM WITHDRAWAL                                  201.50    4,957.78
         FIRST UNIOKINGS PARK        SPRINGFIELVA
         EFFECTIVE  7 SEP
8 SEP    CHECK# 556                        468.46        4,489.32
10 SEP   CHECK# 569                         84.13        4,405.19
10 SEP   CHECK# 558                         32.51        4,372.68
10 SEP   CHECK# 559                        325.00        4,047.68
10 SEP   ATM WITHDRAWAL                                   41.00    4,006.68
         CHEVY CHASSAFEWAY #907      SPRINGFIELVA
11 SEP   CHECK# 570                        200.00        3,806.68

-CONTINUED
608 CY-31  CO-0000  BA-00  BK-02  08438
   </pre>
```

Fig. 6C

PRESIDENTIAL SAVINGS BANK FSB
INTERNET TEST ACCOUNT #1
4520 E WEST HWY
BETHESDA MD 20814-3319

ACCOUNT 99-99-99999

STATEMENT END DATE                             PAGE
30-SEP-97                    2
             99-99-99999

| DATE | DESCRIPTION | DEPOSITS | WITHDRAWALS | BALANCE |
|------|-------------|----------|-------------|---------|
| 11 SEP | CHECK# 567 | | 40.56 | 3,766.12 |
| 11 SEP | CHECK# 561 | | 1,087.55 | 2,678.57 |
| 11 SEP | CHECK# 568 | | 207.00 | 2,471.57 |
| 11 SEP | CHECK# 565 | | 199.78 | 2,271.79 |

| Date | Description | | Amount | Balance |
|---|---|---|---|---|
| 11 SEP | ATM WITHDRAWAL | | 101.50 | 2,170.29 |
| | SIGNET/MD 1776 EAST JEFFERSO ROCKVILLE MD | | | |
| 12 SEP | CHECK# 562 | | 570.51 | 1,599.78 |
| | EFFECTIVE 11 SEP | | | |
| 12 SEP | CHECK# 572-C | | 200.00 | 1,399.78 |
| 12 SEP | CHECK# 560 | | 25.75 | 1,374.03 |
| 13 SEP | ATM WITHDRAWAL | | 201.00 | 1,173.03 |
| | FIRST VIRG 9521 BRADDOCK RD FAIRFAX VA | | | |
| 13 SEP | ATM WITHDRAWAL | | 50.00 | 1,123.03 |
| | PRESIDENTI 4520 EAST-WEST HIG BETHESDA MD | | | |
| 15 SEP | ATM WITHDRAWAL | | 96.00 | 1,027.03 |
| | CRESTAR BA CATHEDRAL 2 WASHINGTON DC | | | |
| | EFFECTIVE 14 SEP | | | |
| 15 SEP | CHECK DEPOSIT | 72.99 | | 1,100.02 |
| 15 SEP | CHECK# 566 | | 50.00 | 1,050.02 |
| 15 SEP | CHECK# 564 | | 28.12 | 1,021.90 |
| 16 SEP | POS WITHDRAWAL | | 100.00 | 921.90 |
| | GIANT OF M 10400 OLD GEORGETO BETHESDA MD | | | |
| 17 SEP | CHECK# 574 | | 39.57 | 882.33 |
| 17 SEP | CHECK# 573 | | 185.22 | 697.11 |
| 17 SEP | POS WITHDRAWAL | | 30.00 | 667.11 |
| | GIANT OF M 10400 OLD GEORGETO BETHESDA MD | | | |
| 18 SEP | ATM WITHDRAWAL | | 100.00 | 567.11 |
| | PRESIDENTI 4520 EAST-WEST HIG BETHESDA MD | | | |
| 19 SEP | CHECK DEPOSIT | 1,300.00 | | 1,867.11 |
| 19 SEP | CHECK# 563 | | 1,480.67 | 386.44 |
| | EFFECTIVE 18 SEP | | | |

```
19 SEP   ATM WITHDRAWAL                           20.00    366.44
         PRESIDENTI4520 EAST-WEST HIGBETHESDA MD
20 SEP   ATM WITHDRAWAL                          201.50    164.94
         FIRST UNIOKINGS PARK    SPRINGFIELVA
22 SEP   CHECK DEPOSIT           1,550.00      1,714.94
24 SEP   CHECK# 575                             1,000.00    714.94
29 SEP   ATM WITHDRAWAL                          101.50    613.44
         CRESTAR BACONGRESSIONAL  ROCKVILLE MD

CY-31 CO-0000 BA-00  BK-02  08439             -CONTINUED
</pre> ~612
<pre ~614
```

PRESIDENTIAL SAVINGS BANK FSB
INTERNET TEST ACCOUNT #1
4520 E WEST HWY
BETHESDA MD 20814-3319

ACCOUNT 99-99-99999

Fig. 6F

STATEMENT END DATE                                              PAGE
30-SEP-97                              3
             99-99-99999
                                                    BALANCE
DATE    DESCRIPTION           DEPOSITS  WITHDRAWALS    ——
————    ——————————            ————————  ———————————
        EFFECTIVE 28 SEP
29 SEP  JOURNAL CREDIT         2,100.23                2,713.67
        MONTGOMERY COUNTY PAYROLL
        EFFECTIVE 30 SEP
30 SEP  POS WITHDRAWAL                    46.13        2,667.54
        SUTTON PLA10323 OLD GEORGETOBETHESDA MD
30 SEP  INTEREST CREDIT           7.61                 2,675.15
30-SEP-97 "NEW BALANCE"————————> 2,675.15

TOTAL AMOUNT OF CREDITS   10,167.41   TOTAL AMOUNT OF DEBITS    8,936.73
NUMBER OF CREDITS                6   NUMBER OF DEBITS                 42

TOTAL AMT. ATM CREDITS         .00   TOTAL AMT. ATM DEBITS      1,704.00
NUMBER ATM CREDITS               0   NUMBER ATM DEBITS                16

TOTAL AMT. POS CREDITS         .00   TOTAL AMT. POS DEBITS        216.83
NUMBER POS CREDITS               0   NUMBER POS DEBITS                 4

********************* ANNUAL PERCENTAGE YIELD EARNED (APYE) *************
DAYS IN PERIOD = 30              INTEREST PAID = 7.61
AVERAGE BALANCE = 1,826.95       ANNUAL PERCENTAGE YIELD EARNED = 5.19%
*****************************************************************************

Fig. 6G

| ------CHECKS------ | | | ------CHECKS------ | | | ------CHECKS------ | | |
|---|---|---|---|---|---|---|---|---|
| ITEM | DATE | AMOUNT | ITEM | DATE | AMOUNT | ITEM | DATE | AMOUNT |
| 552 | 02SEP | 90.00 | 561 | 11SEP | 1,087.55 | 568 | 11SEP | 207.00 |
| 553 | 02SEP | 52.00 | 562 | 12SEP | 570.51 | 569 | 10SEP | 84.13 |
| 554 | 04SEP | 228.44 | 563 | 19SEP | 1,480.67 | 570 | 11SEP | 200.00 |
| * 556 | 08SEP | 468.46 | 564 | 15SEP | 28.12 * | 572 | 12SEP | 200.00 |
| 557 | 05SEP | 420.63 | 565 | 11SEP | 199.78 | 573 | 17SEP | 185.22 |
| 558 | 10SEP | 32.51 | 566 | 15SEP | 50.00 | 574 | 17SEP | 39.57 |
| 559 | 10SEP | 325.00 | 567 | 11SEP | 40.56 | 575 | 24SEP | 1,000.00 |
| 560 | 12SEP | 25.75 | | | | | | |

CY-31 CO-0000 BA-00 BK-02 08440
</pre> ← 616
<b>

```
<pre><b>Back To Demo Page: <a HREF="http://www.presidential.com/demo/psbdemo.htm">Click here </a>Return <a HREF="http://www.presidential.com">home.</a></b></pre>
</body>
</html>
```

Fig. 6H

METHOD, SYSTEM AND COMPUTER PROGRAM PRODUCT FOR HISTORICAL ACCOUNT STATEMENTS

CROSS-REFERENCES TO RELATED APPLICATIONS

This application is related to, and claims the benefit of the earlier filing date of, U.S. Provisional Patent Application Ser. No. 60/121,134, filed Feb. 22, 1999, entitled "A Method, System and Computer Program Product for Historical Financial Institution Statements," the entirety of which is incorporated herein by reference.

BACKGROUND OF THE INVENTION

1. Field of the Invention

This invention relates generally to storage and online retrieval and display of historical account statements. The invention is more specifically related to a method, system and computer program product for storing and retrieving historical account statements for customers or members of organizations. More specifically, this invention relates to a method, system and computer program product for storing and retrieving historical account statements online by using a text version of the account statements stored for periodic printing and mailing of statements as a source of information for formatting and display.

2. Discussion of the Background

With the advent of the World Wide Web (web), many organizations such as businesses have published information regarding their products and services online for access by customers or members and prospective customers or members. Organizations such as financial institutions (e.g., banks, credit unions), credit card companies, utilities, gasoline companies, retail merchants, airlines, distributors and suppliers to other businesses typically mail paper statements reflecting account activity and account status on a regular periodic basis, for example, every month or every quarter. Using security features developed recently for web browser programs, organizations have begun to allow customers or members to access and view information regarding the customers' or members' account activity using web browsers. However, many programs developed to provide this type of information have involved operations of searching databases of the organizations to obtain requested information, followed by formatting operations to format the retrieved account information for suitable display on the accessing customer's or member's web browser.

U.S. Pat. No. 5,712,987 to Waits et al., U.S. Pat. No. 5,721,831 to Waits et al., U.S. Pat. No. 5,812,989 to Witt et al., and U.S. Pat. No. 5,870,725 to Bellinger et al. disclose systems in which information regarding customer transactions are managed.

SUMMARY OF THE INVENTION

Accordingly, one object of this invention is to provide a novel method, system and computer program product for online display of historical account statements which utilizes a text version of an account statement as a source of information. A further object of this invention is to provide a novel method, system and computer program product for providing online access to historical account statements which utilizes a text version of an account statement which is printed on paper and mailed to a customer or member of an organization. A further object of this invention is to provide a novel method, system and computer program product for providing online access to historical account statements which utilizes a text version of an account statement which is printed on paper and mailed to a customer or member of an organization so that the online display appears substantially identical to the printed account statement which is mailed.

In a preferred embodiment, customers desiring to use the system of the present invention log on to the Internet home page of the business. The customer then selects from a menu or menus indicating a choice such as, for a banking example, "PC Internet Banking" followed by "Historical Statements". A screen is then presented requiring identifying entries, for example, for the number of the desired account, the month and year of the desired statement and the password for the account. Upon entry of the correct information, a copy of the statement appears which looks identical in all material respects to the corresponding physical statement previously sent in the mail.

An exemplary embodiment of the system of this invention includes the following five program modules:

1. Loading (Parsing and Scrubbing) Program
2. Administrative Program
3. Client (Customer Access) Program
4. Branch Manager Program
5. Password Program An exemplary embodiment of the system utilizes the following computer hardware servers:

1. Intel Pentium Server, running Netscape 3.0 Enterprise Server software
2. Intel Pentium Server, running Eagle Raptor Firewall v 5.0 software
3. Intel Pentium Server, running Microsoft SQL Server v 6.0 software A unique feature of this invention is that it recreates a customer or member statement from data contained in the original print image file (e.g., an American Standard Code for Information Interchange (ASCII) print image file) produced, for example, by mainframe legacy software, which is created for the periodic (e.g., monthly) job to print original account (e.g., bank, credit union, credit card, utility such as electric, gas or water company, gasoline companies, retail merchants, airlines, distributors and suppliers to other businesses) statements on paper stock for mailing to each customer of a business or member of an organization. The information is reformatted for storage in a database for ease of searching. Upon request, this invention produces a display which includes graphics (e.g., business logos) and watermarks or other distinctive features which may be designed for the paper stock for printed account statements. Therefore, the customer or member accessing the system of this invention views a recreated image of each periodic statement which appears identical in all material respects to, or emulates, an original hard copy statement which is mailed out, but no scanning or filming and storage of graphical images of the statements is required to support the system of this invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A-5D are exemplary online displays of customer request information for display of customer account activity and status;

FIGS. 6A-6H are exemplary Hypertext Markup Language (HTML) instructions used by a web browser to display an exemplary customer account statement;

DESCRIPTION OF THE PREFERRED EMBODIMENTS

Figure 1:
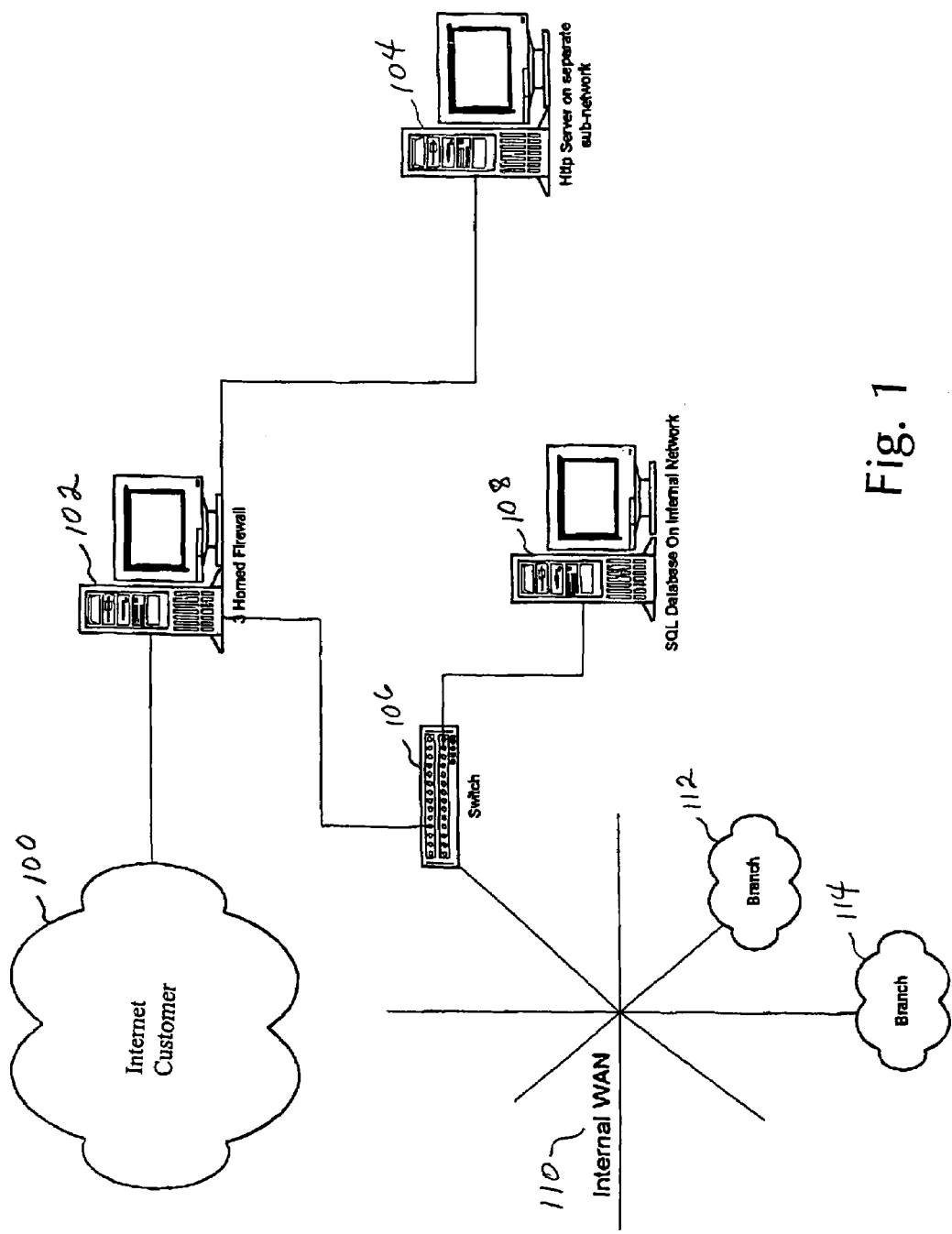
FIG. 1 is a network diagram illustrating exemplary computer hardware servers upon which the invention may be implemented.

Referring now to the drawings, wherein like reference numerals designate identical or corresponding parts throughout the several views, and more particularly to FIG. 1 thereof, there is illustrated a network diagram illustrating exemplary computer hardware servers upon which the invention may be implemented. An Internet Customer 100 is connected to a firewall 102, which is connected to an http (Hypertext Transfer Protocol) server 104 which resides on a separate subnetwork. The firewall 102 is also connected to a switch 106 which in turn is connected to an Internal Wide Area Network (WAN) 110 and a Structured Query Language (SQL) database server. Two branches 112 and 114 are connected to the Internal WAN 110. Clearly, other network configurations and other hardware and software may be used without departing from the spirit and scope of the present invention.

In a preferred embodiment, before an account can be accessed for the first time, a customer or member should call the organization's customer service center to activate the customer's or member's online privileges. After verifying certain customer or member information, the customer service representative will activate the customer's or member's account(s) and provide an initial password. This initial password is valid only for a maximum of, for example, 48 hours.

Upon accessing each account for the first time, the customer or member will be immediately required to change the account password to a password chosen by the customer or member. In a preferred embodiment, the new password must be at least 4, but less than 15 characters. The new password is case-sensitive and may be alphanumeric. If the customer or member does not change the initial password within, for example, 48 hours, then the system of this invention will be deactivated for the respective account(s) and the customer or member will have to call again to reactivate the account(s).

It is recommended that to access the system of the preferred embodiment, a customer or member should a use web browser (e.g., Netscape 3.0 or Internet Explorer 3.0 or higher, or a equivalents). The system of this invention takes full advantage of the encryption security provided by current (and future) web browsers and by the organization's web server. Customer or member transactions are encrypted as they travel over the Internet; thus, a third party attempting to intercept these communications should not be able to decipher them. In addition, the system of this invention may be protected by a password of the customer's choosing.

In a preferred embodiment, the organization maintains a permanent and continuous archive of all customer or member account statements. A specific embodiment of the invention includes a permanent archive of text files for account information which may date back to the inception of storage of statements in the system. Recent technological advances in storage media have made it possible to store large amounts of data inexpensively, so that storage of the text of periodic customer statements of account is not unreasonably expensive. Periodic statements (e.g., monthly statements) are available online within, for example, two days of printing, and therefore may be available online at about the same time as the printed statements are received by the customer or member in the mail. A separate system within the business's PC Internet service may make available real time statement information for the current period (e.g., month, quarter, etc.).

Software for implementing this invention may, for example, be written in the C programming language, or any other programming language such as C++, Visual BASIC, Java, Common Business Oriented Language (COBOL), PLI (Programming Language I) or other high level languages or assembly languages, preferably residing on the http server 104 of FIG. 1. In an exemplary implementation, the software may use, for example, Microsoft Open Database Connectivity (ODBC) routines to communicate over the Internal WAN 110 to the SQL database server 108 through the firewall 102 from the http server 104, although any other database software may be used. In the exemplary implementation, periodic (e.g., monthly, quarterly) source data files are transmitted over a high speed dedicated data communication line from a service bureau data processing center, where the periodic statements may be prepared, to the SQL server database 108 for further processing.

Figure 2A:
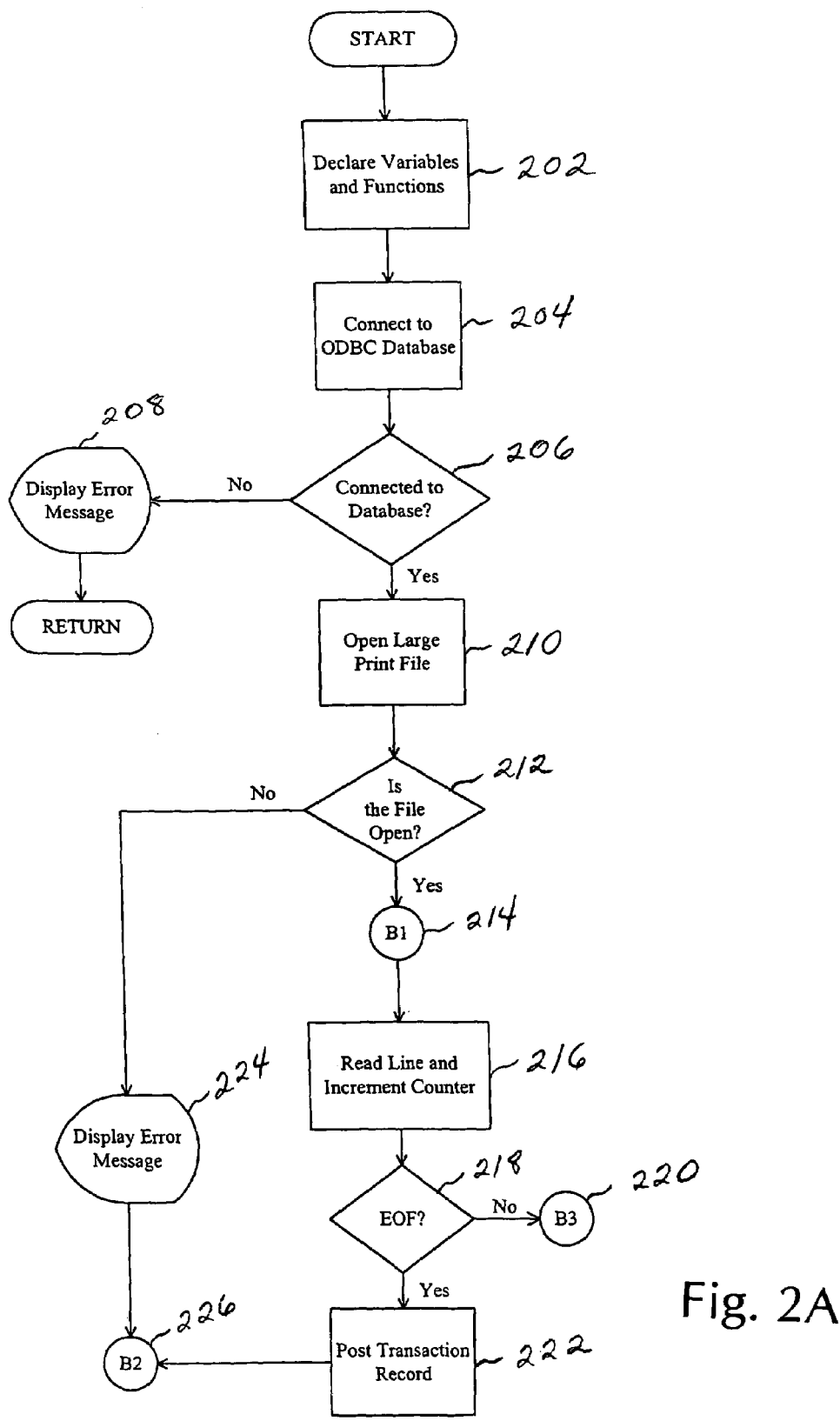
FIGS. 2A-2C are a flowchart of a data loading software module which works in conjunction with a main customer software module shown in FIGS. 3A-3C.
Figure 2B:
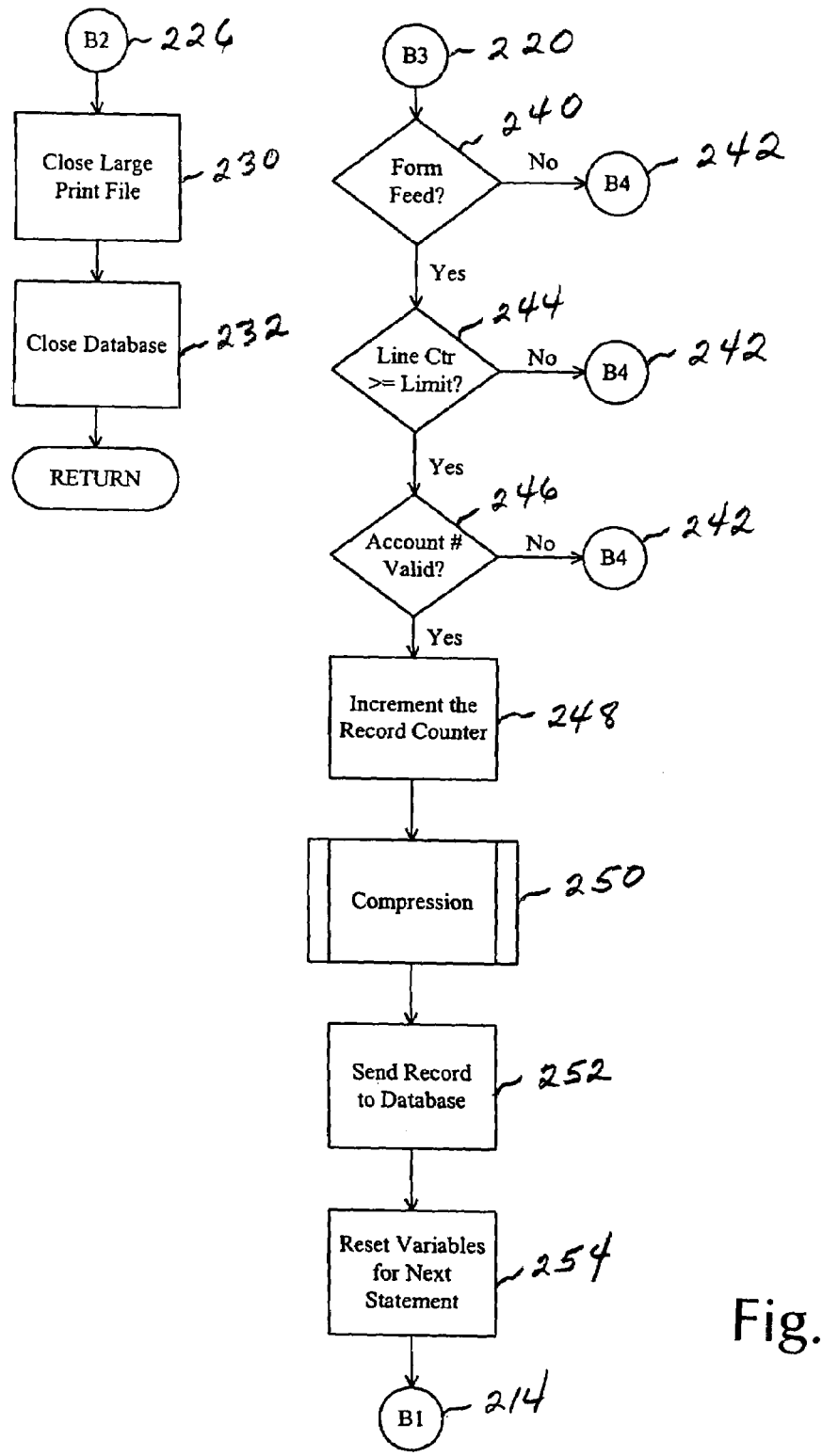
Figure 2C:
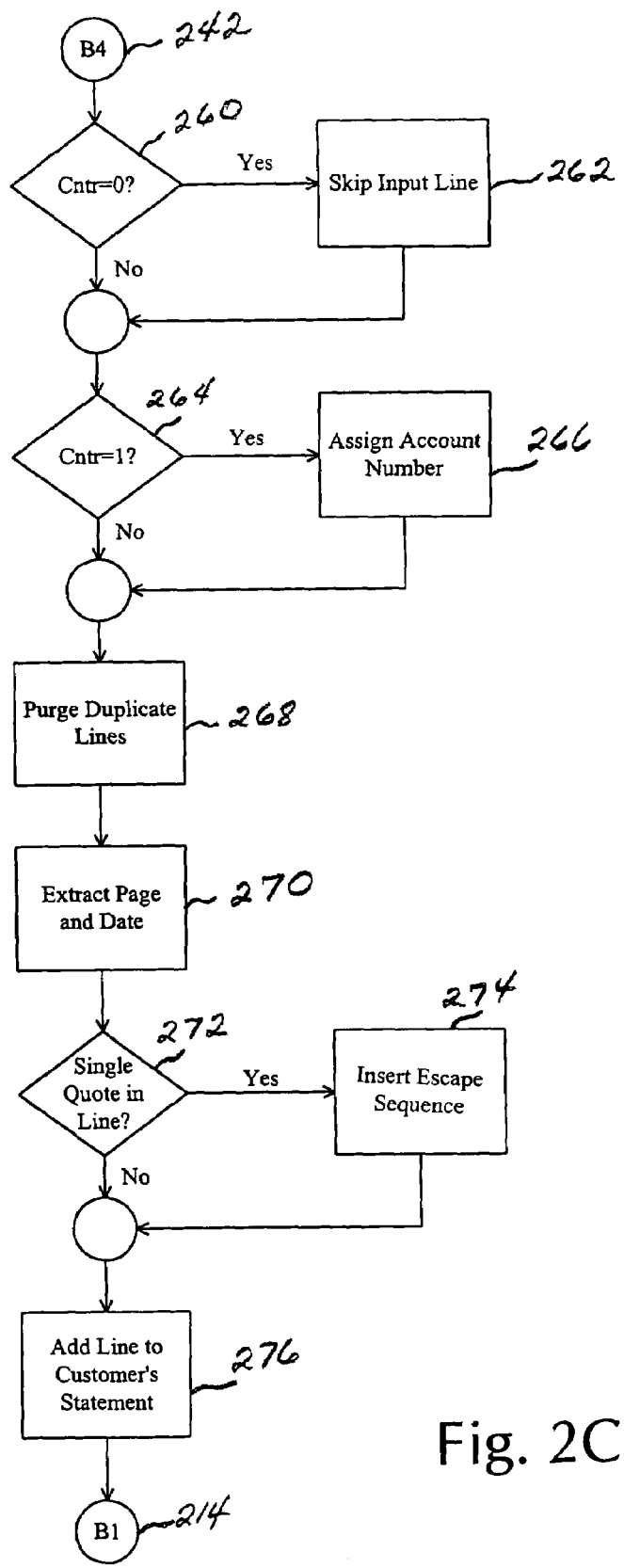
Figure 3A:
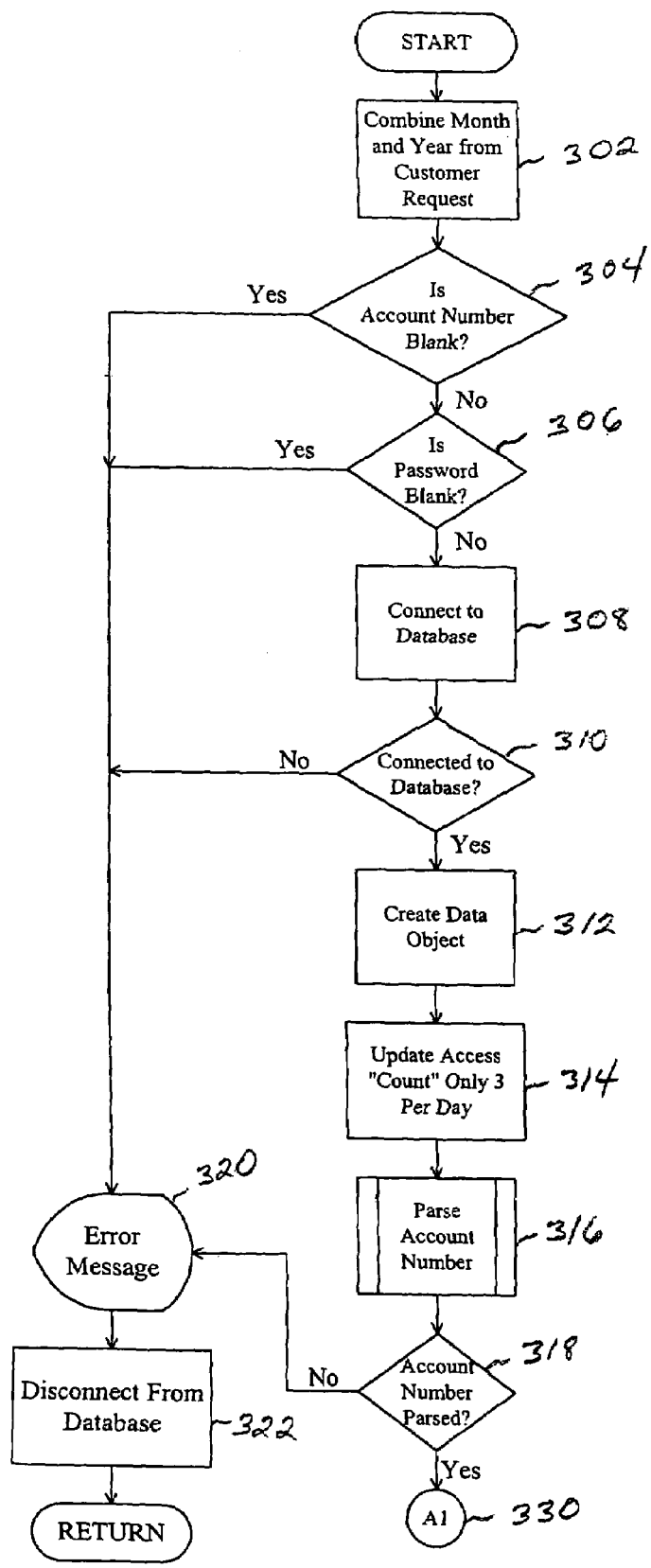
FIGS. 3A-3B are a flowchart of the main customer software module of the invention.
Figure 3B:
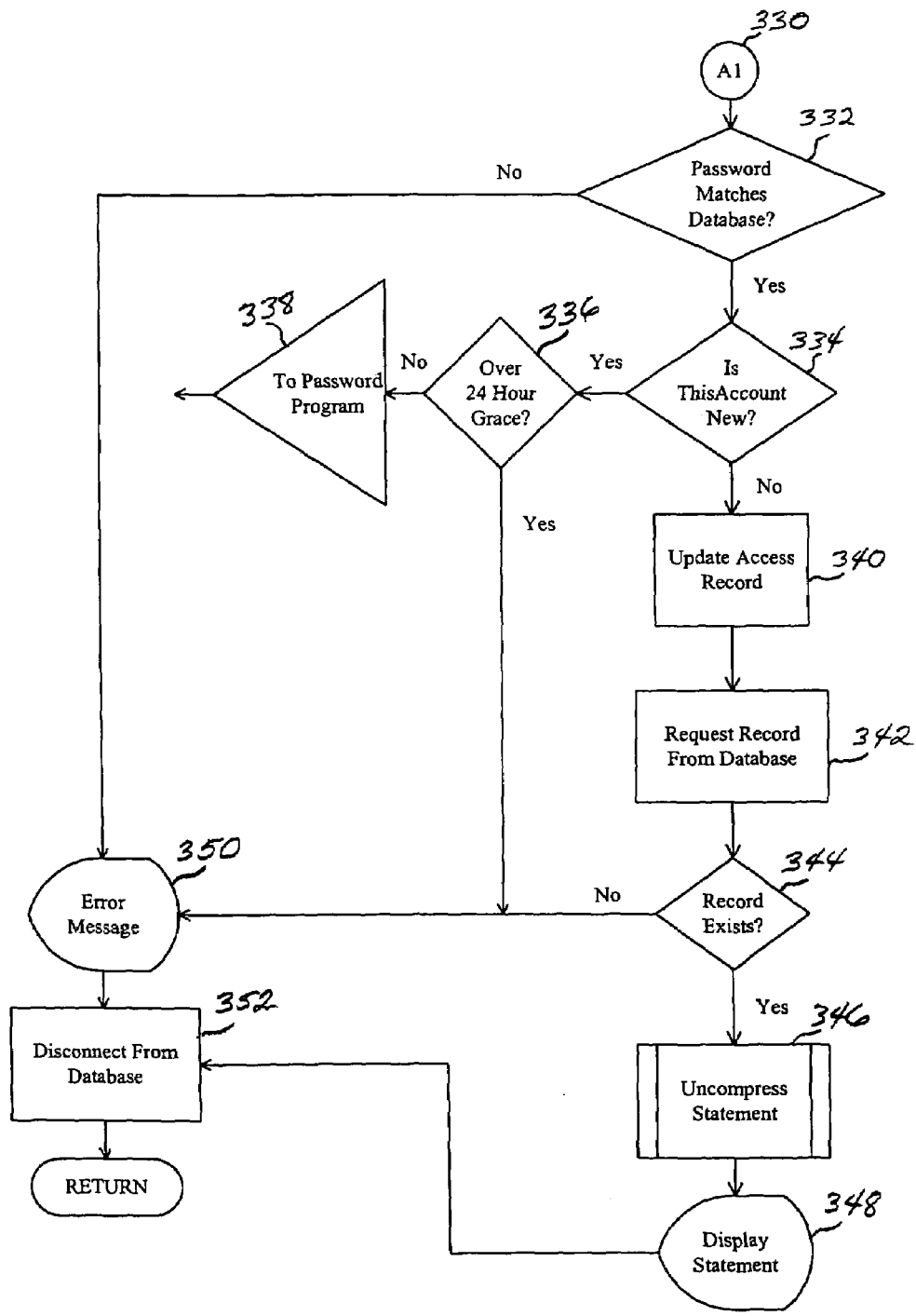
Figure 3C:
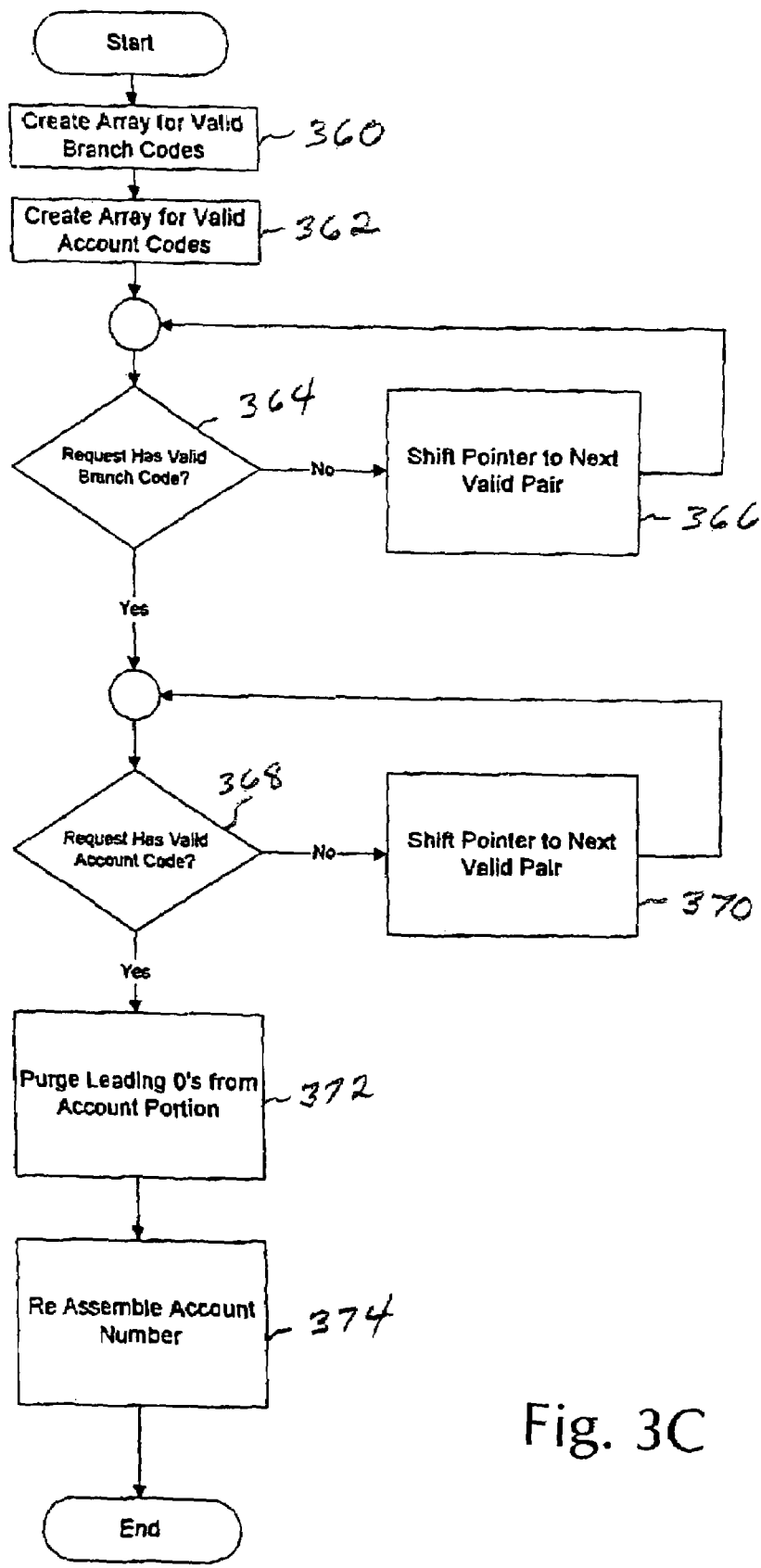
FIG. 3C is a flowchart of an account number parsing function software module.

FIGS. 2A-2C are a flowchart of a data loading software module which works in conjunction with a main customer software module shown in FIGS. 3A-3C. FIGS. 2A-6H are directed to an exemplary embodiment of this invention for a banking institution, although the following description is not intended to limit the scope of the invention to banking institutions. Clearly, this invention may be implemented for any type of organization which mails or creates periodic statements of account activities for customers or members, including banks, credit unions, credit card companies, utilities, airlines, gasoline companies, retail merchants, distributors, suppliers to other businesses and any other type of organization which manages customer or member accounts.

In the exemplary embodiment discussed below with regard to FIGS. 2A-6H, the loading program uses ASCII "print" files from each month's entire bank statement run, containing the bank statements of all of the bank's customers, as input. A plurality of customer statements are included in an ASCII file, separated by, for example, characters indicating an end of page. The loading program "cleans" the ASCII file, purging duplicate lines and non-printing characters, then parses each page of the statement, detecting the account number, statement date, and other identifying information, and then compresses the ASCII data contained on each account statement page and inserts these data into a large SQL database, indexed by account number and date of the statement period. Because each statement contains a large amount of white space, which appears in the ASCII print file as repetitions of the "space" character, a relatively high compression ratio is achieved.

The system parses the statement data specifically searching for an account number and a date. The end of a customer account statement is recognized when an end of page is recognized, followed by a recognition of a different account number on the new page. The statement page number may also be recognized so that a recognition of a first page of a statement may inform the system that the page being parsed is for a different statement from the previous page parsed.

In a preferred embodiment, a very simple, and therefore time efficient, compression algorithm is used. An exemplary algorithm works by inserting the number of immediately consecutive appearances of each character, if the character appears twice or more in succession, as a binary number after a single flagged insertion of the character that is repeated. Bytes representing repeated characters are flagged by adding decimal 128 to the ASCII code for the character that is repeated, to indicate that a binary value (up to 255) for the number of repetitions follows as the next byte. Since the raw data contain only simple ASCII text with non-printing characters removed, each byte will reliably be less than decimal value 128. If the character is not repeated then the character is not flagged and no binary number follows it. The compression algorithm enables the system to efficiently store information regarding the formatting of the text version of the customer account statement.

After starting, step 202 of FIG. 2A declares variables and functions to initialize the data loading software module. Step 204 connects to the ODBC database, which, in this exemplary system, resides on the SQL database server 108 discussed previously with regard to FIG. 1. Step 206 of FIG. 2A determines whether database connectivity has been established. If step 206 determines that database connectivity has not been established, step 208 displays an error message and control is returned to the calling process.

If step 206 determines that database connectivity has been established, step 210 opens a large print file. Step 212 determines whether the large print file has been opened. If step 212 determines that the large print file has not been opened, step 224 displays an error message, and control passes to B2 226, which is discussed below with regard to FIG. 2B. If step 212 determines that the large print file has been opened, control passes to B1 214, which passes control to step 216, which reads a line and increments a counter Cntr. Step 218 determines whether end of file (EOF) has been read. If step 218 determines that EOF has not been read, control passes to B3 220, which is discussed below with regard to FIG. 2B. If step 218 determines that EOF has been read, step 222 posts the final transaction record to the database summarizing the data posted from the print file, and control passes to B2 226, which is discussed below with regard to FIG. 2B.

B2 226 of FIG. 2B passes control to step 230, which closes the large print file. Step 232 closes the database, and control is then returned to the calling process.

B3 220 of FIG. 2B passes control to step 240, which determines whether form feed has been read by step 216 of FIG. 2A. If step 240 determines that form feed has not been read, control passes to B4 242, which is discussed below with regard to FIG. 2C. If step 240 determines that form feed has been read, step 244 determines whether the line counter is greater than or equal to a line count limit. If step 244 determines that the line counter is not greater than or equal to the line count limit, control passes to B4 242, which is discussed below with regard to FIG. 2C. If step 244 determines that the line counter is greater than or equal to the line count limit, step 246 determines whether the account number is valid. If step 244 determines that the account number is not valid, control passes to B4 242, which is discussed below with regard to FIG. 2C. If step 244 determines that the account number is valid, step 248 increments a record counter.

Step 250 calls a compression routine to compress the record. Step 252 sends the record to the database. Step 254 resets the variables for the next statement. Control then passes to B1 214, which was discussed previously with regard to FIG. 2A.

B4 242 of FIG. 2C passes control to step 260, which determines whether the counter Cntr has a value of zero. If step 260 determines that Cntr has a value of zero, step 262 skips an input line, and control passes to step 264, which is discussed below. If step 260 determines that Cntr does not have a value of zero, step 264 determines whether Cntr has a value of one. If step 264 determines that Cntr has a value of one, step 266 assigns an account number, and control passes to step 268, which is discussed below. If step 264 determines that Cntr does not have a value of one, step 268 purges duplicate lines. Step 270 extracts a page and date from the statement data. Step 272 determines whether a single quote (or any other character requiring a translation into an HTML escape sequence) is included in the current line. If step 272 determines that there is a single quote (or other character requiring translation) included in the current line, step 274 inserts the appropriate escape sequence so that the character will be recognized as valid HTML text, and control passes to step 276, which is discussed below. If step 272 determines that a single quote (or other character requiring translation) is not included in the current line, step 276 adds the current line to the customer's statement, and control passes to B1 214, which was discussed previously with regard to FIG. 2A.

FIGS. 3A-3B are a flowchart of the main customer software module of this invention. A branch manager software module (not shown) is very similar to the main customer software module, except the branch manager software module includes logic and code for recording record accesses and allows access to all accounts. The customer software module allows the customer to request output of the system's recreated statement images for the customer's own account(s). For security, a preferred embodiment uses a proprietary TCP/IP port number to connect to the SQL database through a firewall. All transactions are recorded on the firewall, and within the database the last access date and the current status of the account data are recorded. If the customer has three bad password attempts within the same day the system will "lock" the account. For same-day access, a locked account needs to be reset with the administrative program. Alternatively, the customer may wait until the next day, when an additional three access attempts will be permitted before the system again locks the account. The customer software module preferably uses a decompression algorithm that reverses the process performed by the compression algorithm. The customer software module preferably presents the decompressed ASCII data comprising the customer's account statement on, for example, browser wallpaper which closely replicates, in all material respects, the preprinted logos and designs that appear on the paper statement stock upon which the physical statements are printed. Therefore, the account statement image appearing on the browser duplicates, in all material respects, the appearance of the original hard copy statement. However, it is crisper in appearance and transmits faster over the Internet than would a graphical image of the statement.

The optional branch manager program (not shown) allows branch managers and customer service personnel to access all customers' account statements from prior months. The branch manager program is not required for this invention. The branch manager program operates in the same manner as the client program, except that each authorized branch manager and customer service representative has access to any available online statement. The branch manager program includes additional security and a "paper trail" to log all branch manager access activity. Branch managers and customer service representatives are given usernames and passwords to gain supervisory access to the system. When a branch manager or customer service representative accesses an account, the system records his/her username, date, and time, as well as the account number and statement date of the customer's account, for security purposes.

After starting, step 302 of FIG. 3A combines the month and the year which is input from the customer request. Step 304 determines whether the account number has been left blank by the customer. If step 304 determines that the account number has been left blank, control passes to step 320, which is discussed below. If step 304 determines that the account number has not been left blank, step 306 determines whether the password has been left blank by the customer. If step 306 determines that the password has been left blank, control passes to step 320, which is discussed below. If step 306 determines that the password has not been left blank, step 308 connects to the database. Step 310 determines whether connectivity to the database has been established. If step 310 determines that database connectivity has not been established, control passes to step 320, which is discussed below.

If step 310 determines that database connectivity has been established, step 312 creates a data object. Step 314 updates an access count (only three unsuccessful access attempts are permitted per day by the present example). Step 316 calls a routine to parse the account number. Step 318 determines whether the account number has been successfully parsed. If step 318 determines that the account number has been successfully parsed, control passes to A1 330, which is discussed below with regard to FIG. 3B.

Step 320 of FIG. 3A displays an error message. Step 322 then disconnects from the database, and control is returned to the calling process.

A1 330 of FIG. 3B passes control to step 332, which determines whether the password entered by the customer matches a corresponding password in the database. If step 332 determines that the entered password does not match the password in the database, control passes to step 350, which is discussed below. If step 332 determines that the entered password matches the password in the database, step 334 determines whether the account is new. If step 334 determines that the account is new, step 336 determines whether the account age is over a predetermined grace period (e.g., 24 hours, 48 hours). If step 336 determines that the account age is over the predetermined grace period, control passes to step 350, which is discussed below. If step 336 determines that the account age is not over the predetermined grace period, step 338 passes control to a password program.

If step 334 determines that the account is not new, step 340 updates the access record. Step 342 requests the record from the database. Step 344 determines whether the record exists in the database. If step 344 determines that the record does not exist in the database, control passes to step 350, which is discussed below. If step 344 determines that the record exists in the database, step 346 uncompresses the statement. Step 348 displays the statement, and control passes to step 352, which is discussed below.

Step 350 displays an error message. Step 352 disconnects from the database, and control is returned to the calling process.

FIG. 3C is a flowchart of an account number parsing function software module which is called by step 316, which was discussed previously with regard to FIG. 3A. In this exemplary embodiment, customer account numbers are required to include a valid branch code and a valid account type code, as well as an account sequence number. After starting, step 360 creates an array for valid branch codes of the financial institution's branch offices. In this example, branch codes comprise two bytes of data. Step 362 creates an array for valid account type codes. In this example, account type codes comprise two bytes of data. Step 364 determines whether the customer request includes a valid branch code. If step 364 determines that the request does not include a valid branch code, step 366 shifts a pointer to a next valid pair of bytes in the array of valid branch codes and control returns to step 364. If step 364 determines that the request includes a valid branch code, step 368 determines whether the customer request includes a valid account type code. If step 368 determines that the customer request does not include a valid account type code, step 370 shifts the pointer to the next valid pair of bytes in the array of valid account type codes and control returns to step 368.

If step 368 determines that the customer request includes a valid account type code, step 372 strips leading zeros from the account sequence number portion of the data. Step 374 re-assembles the account number, and control is passed to the calling process.

Figure 4:
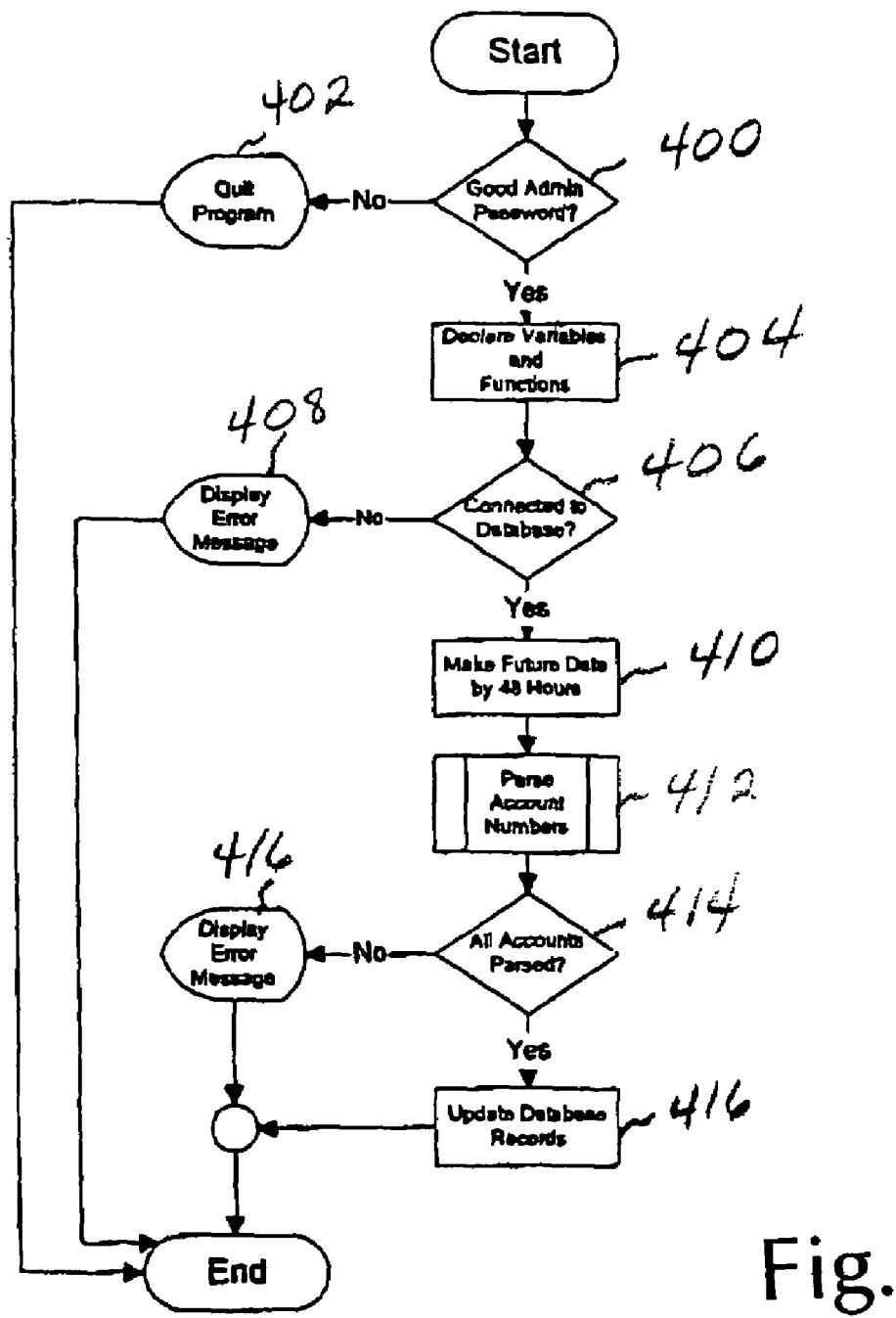
FIG. 4 is a flowchart of an administration software module.

FIG. 4 is a flowchart of an exemplary administration software module. The administrative program is used by the business's customer service personnel to set up customer accounts, by account number, with an initial password. In this example, the administrative program can accommodate up to ten accounts of the same customer at a time. The program locates a customer record and inserts a code and a date-time stamp two days into the future. The customer will have the time indicated by the date-time stamp to access the account for the first time and to change the password to one chosen by the customer.

After starting, step 400 determines whether a good administrative password has been entered. If step 400 determines that a good administrative password has not been entered, step 402 quits the program and control is returned to the calling process. If step 400 determines that a good administrative password has been entered, step 404 declares variables and functions. Step 406 determines whether connectivity to the database has been established. If step 406 determines that connectivity to the database has not been established, step 408 displays an error message and control is returned to the calling process. If step 406 determines that connectivity to the database has been established, step 410 creates a date corresponding to two days in the future. Step 412 calls a routine to parse account numbers. Step 414 determines whether all accounts have been successfully parsed. If step 414 determines that all accounts have not been successfully parsed, step 416 displays an error message and control is returned to the calling process. If step 414 determines that all accounts have been successfully parsed, step 416 updates database records and control is passed to the calling process.

FIGS. 5A-5D are exemplary online displays of customer request information for display of customer account activity and status. In a preferred embodiment, at the system welcome page the customer is required to type in, for example, the account number and password for the desired statement information. Only three unsuccessful access attempts are allowed per account in any 24 hour period, for example. If this number is exceeded, the customer may either wait until the next day to try again or call the business's customer service department during business hours.

After entering the account number and password and selecting the month and year of the statement the customer desires, a "Submit" button is clicked to view the requested statement. The "Back" button of a browser may be used to return to the previous page, in order to request a different month or a different account.

Figure 5A:

FIG. 5A is an exemplary online display of an initial screen querying a customer for bank statement information regarding a bank statement desired by the customer. A software agent, for example, may also be used to request the bank statement of a customer. A financial institution logo 502 is displayed at the top of the display. A dialog box 502 requests the customer's account number. A dialog box 504 requests the customer's password. A dialog box 506 requests the month of the desired statement. A dialog box 508 requests the year of the desired statement. A submit button 510 allows the customer to submit a request after information is supplied to the dialog boxes 502, 504, 506, and 508. A reset button 512 allows the customer to reset the entries in the dialog boxes 502, 504, 506, and 508. A help button 514 allows the customer to request, for example, a help display for help in using the system.

FIGS. 5B-5D illustrate three exemplary screens displaying a customer's account information in substantially (i.e., identical in all material respects) the same format as the customer's monthly statement which has been mailed to the customer.

FIGS. 6A-6H are exemplary Hypertext Markup Language (HTML) instructions used by a web browser to display an exemplary customer account statement similar to the exemplary statement illustrated in FIGS. 5B-5D as discussed previously. An HTML "body" tag 602 of FIG. 6A includes a "background" attribute and a "bgcolor" (background color) attribute which cause a screened, or wallpaper background to be displayed which, for this example, replicates on the display the same design as is pre-printed on the paper stock used for printing and mailing monthly customer account statements, thereby emulating the graphics printed on the paper stock used for printing customer account statements. An HTML "img" (image) tag 604 includes a "src" (source) attribute which, for this example, causes a logo of the business to be displayed exactly as it appears on the printed customer statement. Neither the background nor the logo are shown in the exemplary display of FIGS. 5B-5D which was discussed previously. An HTML "pre" (preformatted) tag 606 causes all text that follows the tag 606 to be displayed as it appears in the HTML file, up to an end tag, or "/pre" tag 608 as shown in FIG. 6C. This text is displayed by the browser in a font that closely resembles the font appearing on the hard copy statements.

Similarly, HTML "pre" tag 610 of FIG. 6D and "pre" tag 614 of FIG. 6F each cause the text following each tag to be displayed as it appears in the HTML file, up to each tag's corresponding end tag, or "/pre" tag 612 of FIGS. 6F and 616 of FIG. 6H, respectively.

Figure 7A:
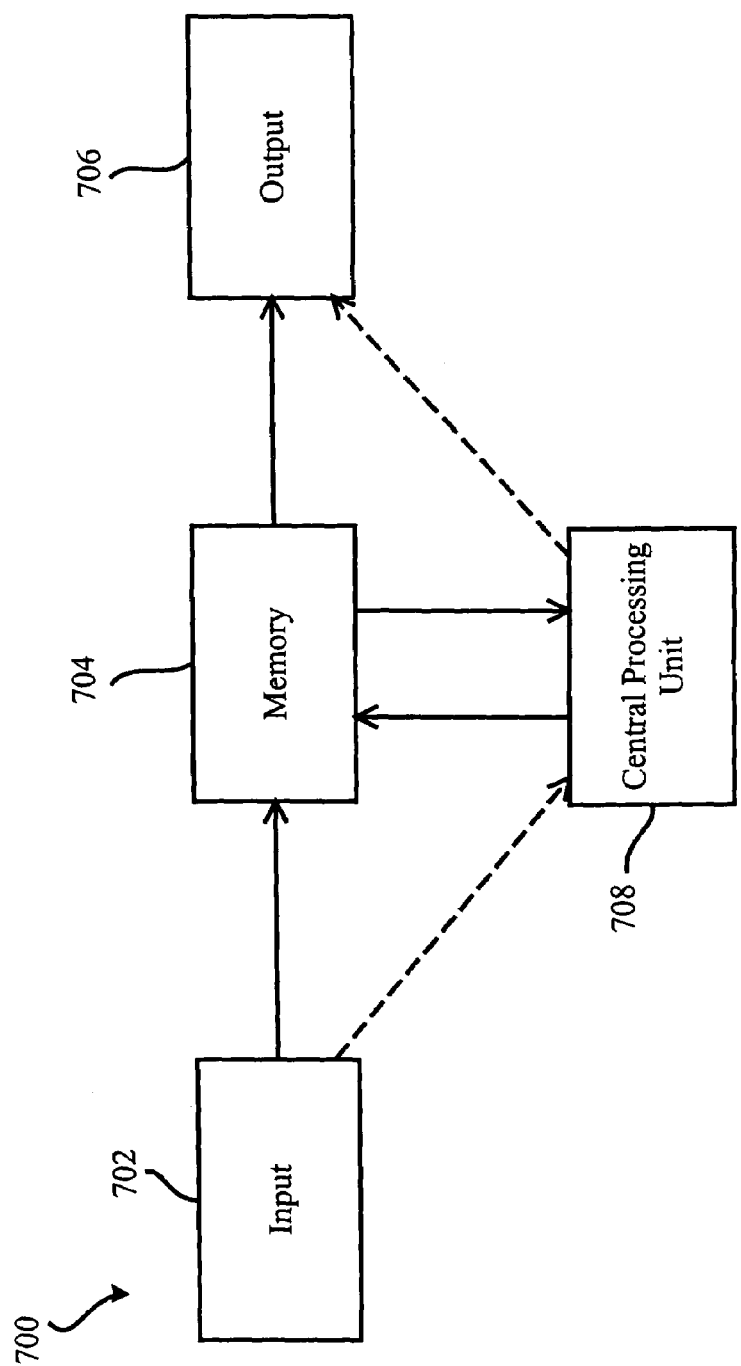
FIG. 7A illustrates an exemplary portion of a generalized computer system upon to which portions of the invention may be implemented.

FIG. 7A illustrates an exemplary portion of a generalized computer system 700 upon which portions of the invention may be implemented. For example, the configurations of the invention may each be implemented by a plurality of computers having a generalized configuration as exemplified by FIG. 7A or by a plurality of computers having configurations similar to those of FIGS. 7A and 7B described below.

An input 702 of FIG. 7A communicates with a memory 704 and a Central Processing Unit 708. The Central Processing Unit 708 communicates with the memory 704 and an output 706. The output 706 is also in communication with the memory 704. The Central Processing Unit 708 may include an arithmetic/logic unit and a control unit in the form of hardware and/or software (not shown). One or more of inputs 702 may each be in communication with one or more memories 704 and/or Central Processing Units 708. One or more Central Processing Units 708 may be in communication with one or more outputs 706 and/or memories 704 and/or inputs 702. One or more memories 704 may be in communication with one or more inputs 702 and/or Central Processing Units 708 and/or outputs 706. Clearly, a plurality of variations of computer hardware configurations may be realized in a network of computer systems upon which portions of the invention may be implemented.

Figure 7B:
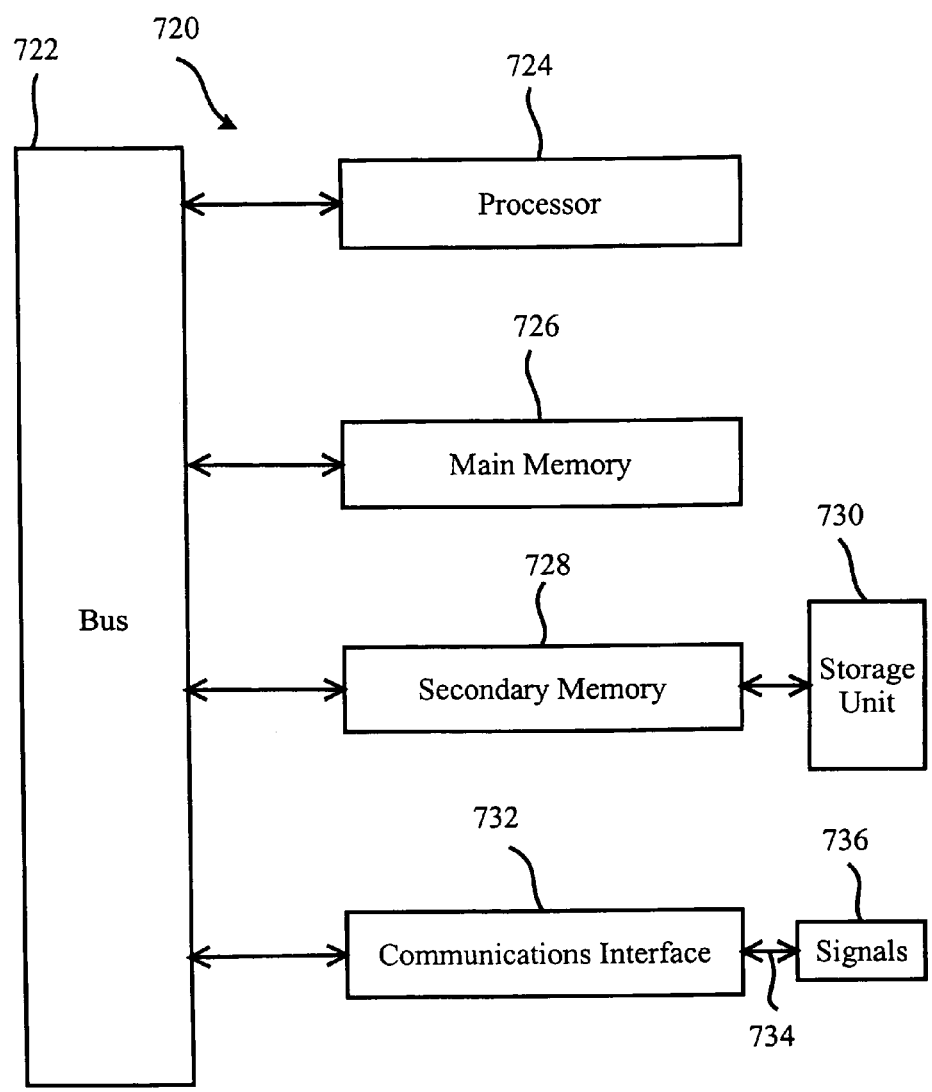
FIG. 7B illustrates an exemplary portion of a generalized hardware configuration, in the format of a workstation, upon which portions of the invention may be implemented.

FIG. 7B illustrates an exemplary hardware configuration of a generalized computer system 720 upon which portions of the invention may be implemented. One or more processors 724 are connected to a communication bus 722. The communication bus 722 also communicates with a main memory 726, preferably a random access memory ("RAM"). A secondary memory 728 communicating with the communication bus 722 may also be included in the computer system 720. The secondary memory 728 may include, for example, a hard disk drive, a removable storage drive such as a floppy disk drive, a magnetic tape drive, an optical disk drive, a program cartridge and cartridge interface, a removable memory chip (e.g., EPROM, PROM, ROM), or any other similar storage medium. The secondary memory 728 may be in communication with a storage unit 730 such as a floppy disk, magnetic tape, optical disk, or other storage medium read by and written to by a secondary memory device. The storage unit 730 includes a computer usable storage medium for storing computer software and data.

The computer system 720 may also include a communications interface 732 in communication with the communication bus 722 for transferring software and data between the computer system 720 and external devices. Examples of communications interfaces 732 include a modem, a network interface (e.g., a network card), a communications port, a PCMCIA slot and card, and other similar interfaces. Software and data transferred via the communications interface 732 are in the form of signals 736 which are provided to the communications interface 732 via a channel 734. The signals 736 may be electronic, electromagnetic, optical or other signals capable of being received by the communications interface 732. The channel 734 may be implemented using wire, cable, fiber optics, a phone line, a cellular phone link, an RF link or other communications channels.

Computer programs are stored in main memory 726 and/or secondary memory 728. Computer programs may be received via the communications interface 732. Computer programs, when executed by the processor 724, enable the computer system 720 to perform the features of the present invention.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Stored on any one or on a combination of computer readable media, the present invention includes software for controlling both the hardware of a computer and for enabling the computer to interact with a human user or a software agent. Such software may include, but is not limited to, device drivers, operating systems, development tools, and user applications. Such computer readable media further includes the computer program product of the present invention for storing and retrieving historical account statement information for online display. The computer code devices of the present invention can be any interpreted or executable code mechanism, including but not limited to scripts, interpreters, dynamic link libraries, Java classes, and complete executable programs.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A method, comprising:
    formatting first formatted account information into second formatted account information;
    storing said second formatted account information in a storage area, without storing graphical images of an original printed account statement;
    interactively inputting a request for said second formatted account information; and
    transferring said second formatted account information from said storage area to a display device for displaying said second formatted account information in a format that is identical to the original printed account statement,
    wherein said first formatted account information comprises formatted information for said original printed account statement;
    said second formatted account information is formatted in HTML; and
    said transferring step includes superimposing said second formatted account information on a background image corresponding to a background of the original printed account statement.

2. The method according to claim 1, wherein said first formatted account information comprises an American Standard Code for Information Interchange (ASCII) print image file.

3. The method according to claim 1, wherein said storage area is included in a Standard Query Language (SQL) database server.

4. The method according to claim 1, wherein said step of interactively inputting comprises one of:
    interactively inputting, by a first customer of a first business, a request for said second formatted account information by using a graphical user interface,
    interactively inputting, by a software agent of a second customer of a second business, a request for said second formatted account information by using a graphical user interface,
    interactively inputting, by a first member of a first organization, a request for said second formatted account information by using a graphical user interface, and
    interactively inputting, by a software agent of a second member of a second organization, a request for said second formatted account information by using a graphical user interface.

5. The method according to claim 1, wherein said step of formatting comprises formatting said first formatted account information into said second formatted account information using a compression algorithm for compressing said first account information and for indicating formatting information of said printed account statement in said second formatted account information.

6. The method according to claim 1, wherein said account information comprises account information for at least one of a customer of a first organization and a member of a second organization.

7. The method according to claim 6, wherein said first organization comprises at least one of
    a bank,
    a credit union,
    a utility,
    a gasoline company,
    an airline,
    a distributor,
    a supplier to businesses,
    a retail merchant, and
    a credit card company.

8. A system, comprising:
    a formatting device that formats first formatted account information into second formatted account information;
    a storing device that stores said second formatted account information in a storage area, without storing graphical images of an original printed account statement;
    an input device that interactively inputs a request for said second formatted account information; and
    a transferring device that transfers said second formatted account information from said storage area to a display device for displaying said second formatted account information in a format that is identical to the original printed account statement, wherein said first formatted account information comprises formatted information for said original printed account statement;
    said second formatted account information is formatted in HTML; and said transferring device superimposes said second formatted account information on a background image corresponding to a background of the original printed account statement.

9. The system according to claim 8, wherein said first formatted account information comprises an ASCII print image file.

10. The system according to claim 8, wherein said storage area is included in a SQL database server.

11. The system according to claim 8, wherein said input device is further configured to perform one of:
    interactively inputting, by a first customer of a first business, a request for said second formatted account information by using a graphical user interface, interactively inputting, by a software agent of a second customer of a second business, a request for said second formatted account information by using a graphical user interface, interactively inputting, by a first member of a first organization, a request for said second formatted account information by using a graphical user interface, and interactively inputting, by a software agent of a second member of a second organization, a request for said second formatted account information by using a graphical user interface.

12. The system according to claim 8, wherein said formatting device comprises a compression device configured to compress said first account information and to indicate formatting information of said printed account statement in said second formatted account information by using a compression algorithm.

13. A computer program product including a computer readable medium embodying program instructions for causing a system to perform the steps of:

formatting first formatted account information into second formatted account information;

storing said second formatted account information in a storage area, without storing graphical images of an original printed account statement;

interactively inputting a request for said second formatted account information; and transferring said second formatted account information from said storage area to a display device for displaying said second formatted account information in a format that is identical to the original printed account statement, wherein said first formatted account information comprises formatted information for said original printed account statement;

said second formatted account information is formatted in HTML; and said transferring step includes superimposing said second formatted account information on a background image corresponding to a background of the original printed account statement.

14. The computer program product according to claim 13, wherein said first formatted account information comprises an ASCII print image file.

15. The computer program product according to claim 13, wherein said storage area is included in a SQL database server.

16. The computer program product according to claim 13, wherein said step of interactively inputting comprises one of:

interactively inputting, by a first customer of a first business, a request for said second formatted account information by using a graphical user interface, interactively inputting, by a software agent of a second customer of a second business, a request for said second formatted account information by using a graphical user interface, interactively inputting, by a first member of a first organization, a request for said second formatted account information by using a graphical user interface, and interactively inputting, by a software agent of a second member of a second organization, a request for said second formatted account information by using a graphical user interface.

17. The computer program product according to claim 13, wherein said step of formatting comprises formatting said first formatted account information into said second formatted account information using a compression algorithm for compressing said first account information and for indicating formatting information of said printed account statement in said second formatted account information.

18. The method of claim 1, wherein said background image includes at least one of a watermark image, a letterhead image, and a screened image.

19. The system of claim 8, wherein said background image includes at least one of a watermark image, a letterhead image, and a screened image.

20. The computer program product of claim 13, wherein said background image includes at least one of a watermark image, a letterhead image, and a screened image.

* * * * *